(No Model.)
E. P. TURNER.
DRESS GUARD FOR BICYCLES.
No. 597,867.  Patented Jan. 25, 1898.
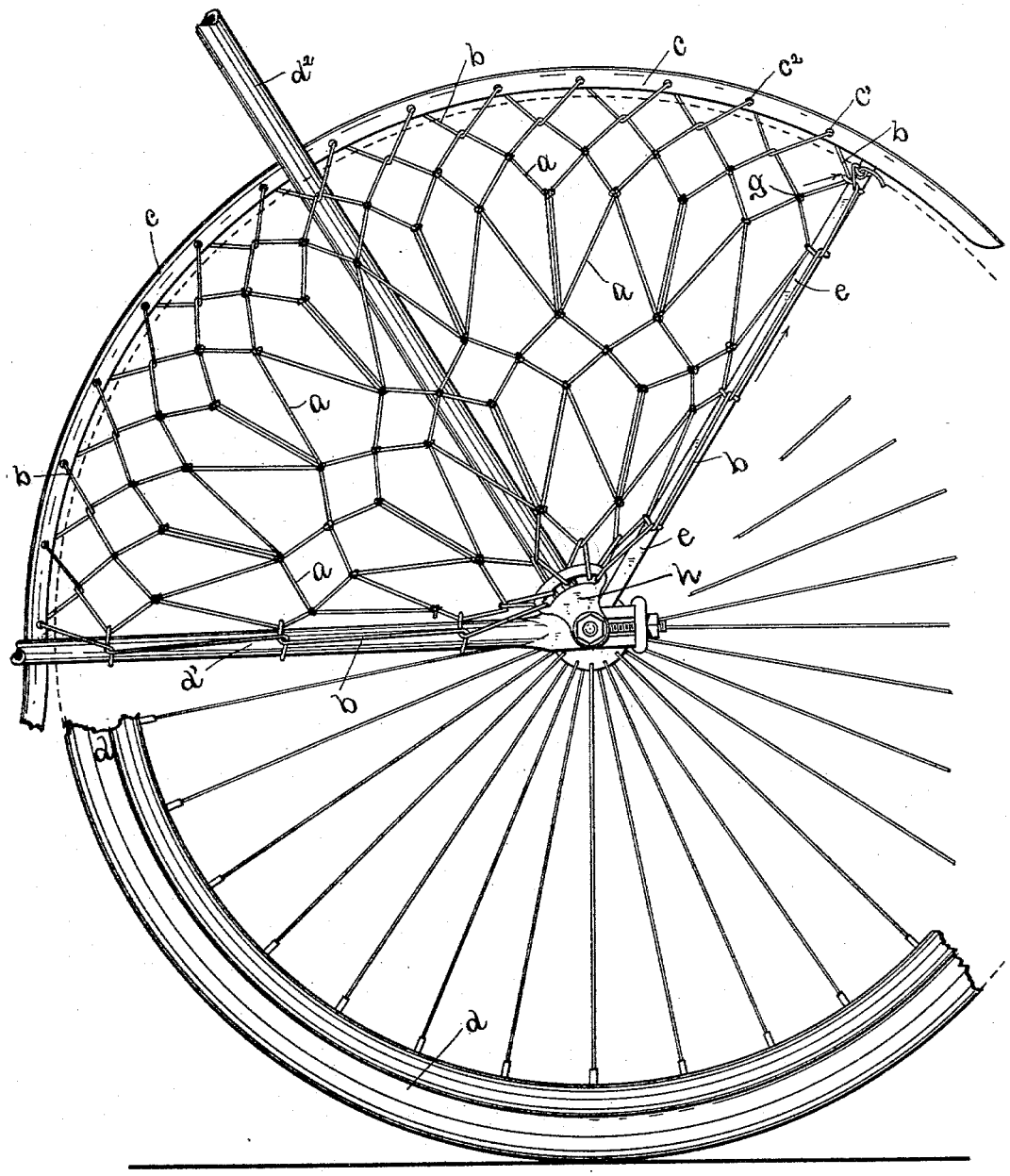
WITNESSES
INVENTOR,
Emerson P. Turner,
BY
Frank H. Allen
ATTORNEY.

UNITED STATES PATENT OFFICE.

EMERSON P. TURNER, OF NORWICH, CONNECTICUT.

DRESS-GUARD FOR BICYCLES.

SPECIFICATION forming part of Letters Patent No. 597,867, dated January 25, 1898.

Application filed February 18, 1897. Serial No. 624,046. (No model.)

*To all whom it may concern:*

Be it known that I, EMERSON P. TURNER, a citizen of the United States, residing at Norwich, in the county of New London and State of Connecticut, have invented a certain new and useful Improvement in Dress-Guards for Bicycles, of which the following is a specification, reference being had to the accompanying drawing, which represents my said invention as properly attached to the mud-guard and framework adjacent to the rear wheel of a bicycle.

My said invention relates particularly to a guard or shield of pleasing design and simple construction that may be readily attached to the rear framework of a lady's bicycle to keep the dress of the rider from contact with the wheel, and one aim of my said invention is to produce a dress-guard formed of a single continuous piece of cord or the like material which shall be netted, interlaced, or otherwise formed into the exact shape to be laced to the mud-guard and framework of the wheel.

Heretofore dress-guards have been formed of wires and also of rectangular sections of network that have been drawn into the desired shape and then tied in position by a separate piece of cord or secured by hooks adapted to engage holes in the mud-guard and rings on the wheel-frame; but in such rectangular pieces of netting when drawn into shape to fit the space at each side of the wheel the meshes have been distorted and the symmetry and original design of the net destroyed. In contradistinction to this my newly-invented dress-guard is netted in the exact shape of the space to be covered, and after the completion of the network the same cord of which said net is formed is left sufficiently long to serve as a lacing-string to go completely around the dress-guard and lace the latter to the framework of the machine, as seen in the drawing, in which—

The letter $a$ indicates the network, and $b$ the lacing-string.

$c$ denotes a metallic mud-guard extending around the upper portion of the wheel $d$ and $d'$.

$d^2$ denotes portions of the rear framework of the machine.

$e$ indicates a rod secured to the framework of the machine near the rear axle of the wheel and serving to support the rear portion of the mud-guard $c$ in the usual manner.

The network $a$ when stretched to give to its meshes a symmetrical and uniform appearance is of the proper size and shape to cover the space inclosed by framework $d'$, mud-guard $c$, and rod $e$.

In the manufacture of the network $a$ the knot indicated by reference-letter $g$ is the last one made in the net, and instead of cutting off the cord or other material from which said net is formed adjacent to said knot such material is left, as I have already stated, of sufficient length to serve as a lacing-cord to pass entirely around the net proper and connect its various meshes to the metal framework of the wheel. Said lacing extends from knot $g$ in the direction of the arrow to and around the bar $e$ and thence outward to and through a hole $c'$ in the arc-shaped mud-guard $c$, said cord being then carried inward, (toward the center of the wheel,) where it is looped through a mesh of the net and then carried outward and to the next hole $c^2$ of said mud-guard, this operation being repeated until all the meshes forming the outer curved edge of the net as originally formed are laced to the said mud-guard, when said lacing is carried to the lower frame portion $d$ and looped around the same in such manner as to include the adjacent mesh of the net when it is carried around itself in a half-hitch and thence along said frame a suitable distance to loop around the next mesh, and this operation is repeated until the net has been laced to said frame the entire length of the latter, when the lacing is passed through a plate $h$ (having a curved slot therein) a sufficient number of times to lace adjacent meshes of the net to said plate. The said lacing is then carried upward along the rod $e$, being passed around said rod and around the adjacent meshes in a half-hitch of the net until the point is reached where the lacing operation was begun, and at or near said point the end of the lacing-string is secured by tying the same around the rod $e$ or in any other suitable way. The net is thus stretched evenly over the space which it is desired to cover; and if said net becomes stretched it may be taken up quickly by relacing it after the manner already explained in detail.

My described device is simple in its construction, may be very cheaply produced, is formed of a single piece of material, and I find in practice it performs in a most satifactory manner the service for which it is intended.

Having thus described my invention, I claim—

In a bicycle, the combination, with a mud-guard provided with openings, of a slotted plate secured to the rear frame, a dress-guard, the outer meshes of which are adjacent to the mud-guard and to the rear frame, and a lacing-cord formed integral with the dress-guard, said cord being passed alternately through the meshes of the dress-guard and through the openings of the mud-guard and the slot in the plate, and alternately through the meshes of the dress-guard and around the rear frame, substantially as set forth.

EMERSON P. TURNER.

Witnesses:
FRANK H. ALLEN,
ALONZO M. LUTHER.